US006749405B2

(12) United States Patent
Bassine

(10) Patent No.: US 6,749,405 B2
(45) Date of Patent: Jun. 15, 2004

(54) REVERSIBLE PIVOTING VANE ROTARY COMPRESSOR FOR A VALVE-FREE OXYGEN CONCENTRATOR

(76) Inventor: Stuart Bassine, 141 Twin Spring Rd., Hendersonville, NC (US) 28792

( * ) Notice: Subject to any disclaimer, the term of this patent is extended or adjusted under 35 U.S.C. 154(b) by 0 days.

(21) Appl. No.: 10/123,627

(22) Filed: Apr. 16, 2002

(65) Prior Publication Data

US 2002/0114706 A1 Aug. 22, 2002

Related U.S. Application Data

(63) Continuation-in-part of application No. 09/595,493, filed on Jun. 16, 2000, now Pat. No. 6,371,745.

(51) Int. Cl.[7] .......................... F04B 35/04; F04C 18/44; B01D 53/04

(52) U.S. Cl. .................... 417/313; 417/326; 417/410.3; 418/268; 55/284; 55/286; 55/287; 96/124

(58) Field of Search ................................ 417/313, 326, 417/410.3; 418/239, 268; 55/284, 286, 287; 95/98, 100; 96/124

(56) References Cited

U.S. PATENT DOCUMENTS 5,114,441 A * 5/1992 Kanner et al. ................. 95/98
5,188,524 A * 2/1993 Bassine ...................... 418/152
5,871,565 A * 2/1999 Leavitt ........................ 95/100
5,968,236 A * 10/1999 Bassine ....................... 96/130
6,371,745 B1 * 4/2002 Bassine ...................... 418/268
6,520,752 B1 * 2/2003 Hosford ...................... 417/313

* cited by examiner

*Primary Examiner*—Charles G. Freay
(74) *Attorney, Agent, or Firm*—William E. Noonan

(57) ABSTRACT

A reversible pivoting vane rotary compressor includes a housing having a generally cylindrical chamber defined by an inner wall. A rotor is mounted eccentrically within the chamber to define about the rotor a generally crescent shaped compression chamber, which narrows from a main chamber region to a constricted chamber region, which rotor has a circumferential surface. A pair of reversible intake and exhaust ports are connected communicably with the constricted chamber region. Each port selectively and alternately introduces air into the constricted chamber region while the other port exhausts air from the constricted region. At least one adjoining pair of curved vanes are pivotably attached to the rotor and extend in generally opposite arcuate directions from the rotor into the chamber. A motor is provided for rotatably driving the rotor alternately in opposing first and second directions such that both of the adjoining vanes are urged simultaneously against the inner wall of the chamber to define at least one compartment that transmits the air through the chamber between the pair of intake and exhaust ports and through the main chamber region. Air introduced through a selected one of the ports is compressed and discharged through the other port.

14 Claims, 7 Drawing Sheets

12
66
18
90
192b
170d
194b
153
116
174
170e
172
160
192c
148
172
174
114
170f
190
190
112
140
180
194c
170g
192d
92
16
64
170h
194d
170a
26
192a
150
170b
194a
170c 24
26
118
124
126
128
120
112
130
132
170C
170b
170a
170h
140
146
12
136
122
18a
16a 210
212
18a
266
250
215
240
216
214
290
272
270
274
300
248
16a

REVERSIBLE PIVOTING VANE ROTARY COMPRESSOR FOR A VALVE-FREE OXYGEN CONCENTRATOR

RELATED APPLICATION

This application is a continuation in part U.S. patent application Ser. No. 09/595,493 filed Jun. 16, 2000, now U.S. Pat. No. 6,371,745.

FIELD OF THE INVENTION

This invention relates to a reversible pivoting vane rotary compressor and in particular to a compressor used in a valve-free oxygen concentrator and analogous applications.

BACKGROUND OF THE INVENTION

Conventional oxygen concentrators often employ a rotary compressor to pump air through the concentrator and to the patient. Such compressors provide a desirably high rate of air flow and do not generate excessive pressures. The typical rotary compressor features carbon vanes that are slidably mounted in generally radial slots in the compressor's rotor. The rotor itself is eccentrically mounted in a chamber formed in the housing of the compressor. An electric motor drives the rotor such that centrifugal force urges the carbon vanes outwardly from their slots to engage the wall of the chamber. The vanes form successive compartments that collect air that is introduced into the compressor. As the vanes rotate, the air is moved into a gradually constricted portion of the chamber where it is compressed. This compressed air is then delivered through an exhaust port to the concentrator's filter.

Recently, I developed a valve-free oxygen concentrator. See U.S. Pat. No. 5,968,236. Therein, a reversible motor is operably connected to a pair of compressors, each of which is communicably connected to a respective nitrogen filter. The motor drives each compressor in a forward direction to pump air through the nitrogen filter. As a result, the filter extracts nitrogen from the air pumped therethrough to produce concentrated oxygen. Alternately, the motor drives the compressor in a reverse direction to evacuate the filter. The extracted nitrogen is exhausted from the filter by the compressor.

Conventional carbon vane rotary compressors exhibit a number of significant problems. As each vane slides back and forth within its respective slot, a considerable amount of heat is generated. Moreover, the friction resulting from such sliding causes the vanes to wear and generates carbon dust, which can foul the compressor. As a result, these types of compressors required frequent maintenance. In particular, the dust must be removed an the vanes replaced at regular intervals. Moreover, due to the constant wear on the vanes, known rotary compressors are very likely to exhibit gaps between the ends or tips of the vanes and the chamber wall. This can result in air leakage, which may significantly impair the operation of the compressor and the oxygen concentrator.

Carbon vane compressors cannot be used at all in the valve-free concentrator described above. The carbon vanes are designed to operate in a single direction only. The vanes are not able to instantly change direction so that the compressor operates in the reverse direction when the motor reverses.

I have developed a pivoting vane compressor, which represents a significant improvement over standard carbon vane compressors. See U.S. Pat. No. 5,188,524. That reference features a pivoting vane rotary compressor wherein pairs of opposing vanes mounted to a rotor define pockets or compartments. As the vanes rotate, the respective compartments are gradually constricted to compress the air being transmitted by the machine. Although this product works quite well, it was not developed for use in conjunction with the reversible, valve-free oxygen concentrator. Specifically, the device of U.S. Pat. No. '524 was again intended principally for operating in a single direction and was not designed for reversible operation. In a valve-free reversible concentrator, balanced, consistent and uninterrupted compressor operation is critical in order for high levels of concentrated oxygen to be continuously and efficiently produced. The two compressors must perform alternately in an equal, complementary and uninterrupted manner in order to provide the respective nitrogen filters with consistent, properly balanced supplies of air. If this is not achieved, the concentrator may produce varying concentrations of oxygen over time, which is quite undesirable. A specific need exists for an improved reversible compressor specifically intended for use in a reversible, valve-free oxygen concentrator and capable of efficiently producing balanced, consistent and uninterrupted high levels of air flow to the nitrogen filters of the concentrator.

SUMMARY OF THE INVENTION

It is therefore an object of this invention to provide an improved pivoting vane rotary compressor that is specifically designed for use in a reversible, valve-free oxygen concentrator.

It is a further object of this invention to provide reversible pivoting vane rotary compressors which generate a consistent, balanced and interrupted air flow to the nitrogen filters of a oxygen concentrator so that a consistent high level of concentrated oxygen is produced over a given time.

It is a further object of this invention to provide a reversible pivoting vane rotary compressor that is capable of reversing direction instantaneously and operating in a balanced uninterrupted manner in both compression and vacuum drawing modes.

It is a further object of this invention to provide a reversible pivoting vane rotary compressor wherein each compressor port alternates as an inlet port and as an exhaust port depending upon the direction of the compressor's rotation so that an efficient, balanced operation is achieved.

It is a further object of this invention to provide a pair of reversible pivoting vane rotary compressors in an oxygen concentrator, which employ equivalent, complementary internal constructions and port structures so that a consistent, well balanced and uninterrupted compressor and concentrator operation is exhibited.

This invention results from a realization that a significantly improved and highly efficient valve-free concentrator may be achieved by employing reversible compressors that utilize identically oriented pairs of alternating intake and exhaust ports. Pumping efficiency is further enhanced by constructing the vanes and the rotor of each compressor such that each vane is driven into flush interengagement with the circumferential surface of the rotor during each rotation of the rotor through a constricted portion of the compression chamber. Adjoining vanes are positioned in close proximity to one another to minimize the size of the compartments or pockets in which the air is being compressed. This improves pumping efficiency. This invention further realizes that an improved, balanced and selected compressor performance may be achieved by orienting the intake and exhaust ports symmetrically at equal radial angles relative to the most constricted region of the compression chamber or at other selection positions which provide corresponding pumping performance. Providing channels in the wall of the compression chamber adjacent to one or more of the ports further improves compressor performance by enhancing air flow and/or reducing drag.

This invention features a reversible pivoting vane rotary compressor including a housing having a generally cylindrical chamber defined by an inner wall. A rotor is mounted eccentrically within the chamber to define about the rotor a generally crescent shaped compression chamber, which narrows from a main chamber region to a constricted chamber region. The rotor has a circumferential surface. There are a pair of reversible intake and exhaust ports connected communicably with the constricted chamber region, each port for selectively and alternately introducing the air into the constricted chamber region while the other port exhausts air from the constricted region. At least one adjoining pair of curved vanes are pivotably attached the rotor and extend generally opposite arcuate directions from the rotor into the chamber. There are means for rotatably driving the rotor alternately in opposing first and second directions such that both of the adjoining vanes are urged simultaneously against the inner wall of the chamber to define at least one compartment that transmits the air through the chamber between the pair of intake and exhaust ports and through the main chamber region. As a result, air introduced through a selected one of the ports is compressed and discharged through the other port.

In a preferred embodiment, the circumferential surface of the rotor and each vane have substantially conforming curvatures and the rotor is positioned within the chamber such that each vane is driven into substantially flush interengagement with the circumferential surface when the vane is driven by the rotor into the constricted chamber region. At least one pair of vanes may extend outwardly from the rotor in a convergent manner and at least one pair of vanes may extend outwardly from the rotor in a divergent manner. The pair of intake and exhaust ports may be oriented about the chamber at equal and opposite radial angles relative to a narrowest portion of the constricted chamber region. One or more channels may be formed in the wall of the chamber in communication with one or more of the ports. This feature achieves improved air intake and/or reduces air resistance and drag near the exhaust port.

An oxygen concentrator may employ at least one and preferably two of the compressors as set forth above. The concentrator may include first and second nitrogen filters. A first reversible pivoting vane rotor compressor may be communicably and operably connected to a first filter and a second reversible pivoting vane rotary compressor may be communicably and operably connected to the second filter. Motor means may be provided for rotatably driving the rotors of the first and second compressors alternately in opposing first and second directions such that in each compressor, both of the adjoining vanes are urged simultaneously against the inner wall of the chamber to define at least one compartment that transmits air through the chamber between the pair of intake and exhaust ports and through the main chamber region. As a result, air introduced through one of the ports is compressed in the chamber and discharged through the other port. The motor means drives the first compressor in a forward direction to pump air into and through the first filter while simultaneously driving the second compressor in a reverse direction to evacuate the second filter. Alternately, the motor means drives the first compressor in a reverse direction to evacuate the first filter while simultaneously driving the second compressor in a forward direction to pump air into and through the second filter.

DETAILED DESCRIPTION OF PREFERRED EMBODIMENTS

Other objects, features and advantages will occur from the following description of a preferred embodiment and the accompanying drawings, in which.

Figure 1:
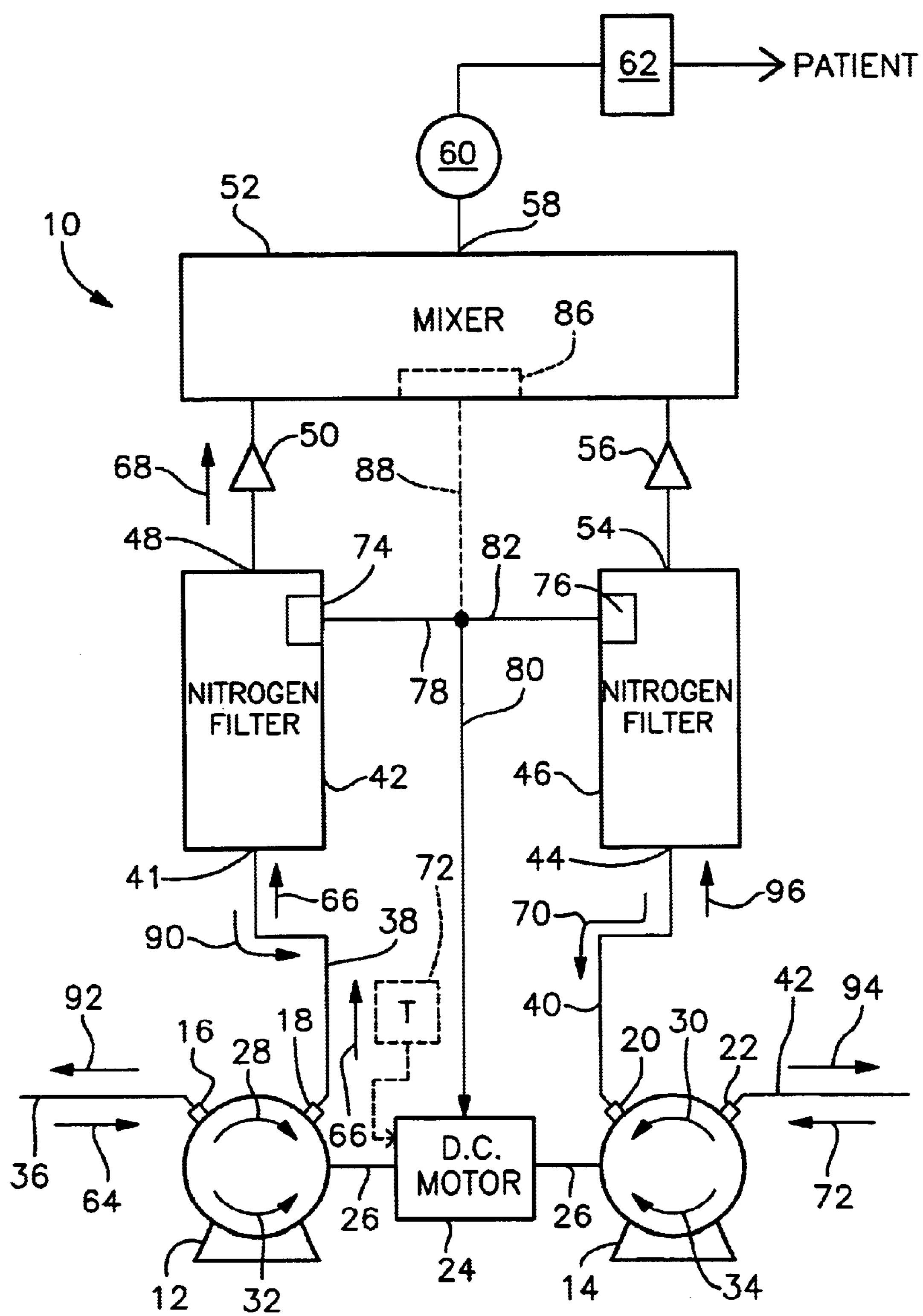
FIG. 1 is a schematic view of a preferred valve-free oxygen concentrator according to this invention, which includes a pair of rotary compressors constructed in accordance with this invention.

There is shown in FIG. 1 a valve free oxygen concentrator 10 that employs a pair of conventional rotary compressors or pumps 12 and 14. Compressors 12 and 14 are described in detail below. In general, each compressor includes an internal rotor mounted eccentrically within a chamber and carrying a plurality of pivoting vanes that compress air as the rotor turns within the chamber. Compressor 12 includes a pair of ports 16 and 18 through which air is introduced into and discharged from the compressor in an alternating fashion that is described more fully below. Similarly, compressor 14 includes a pair of ports 20 and 22 for introducing air into and discharging air from compressor 14. The compressors are structurally equivalent; port 16 corresponds to port 20 and port 18 corresponds to port 22.

Figure 2:
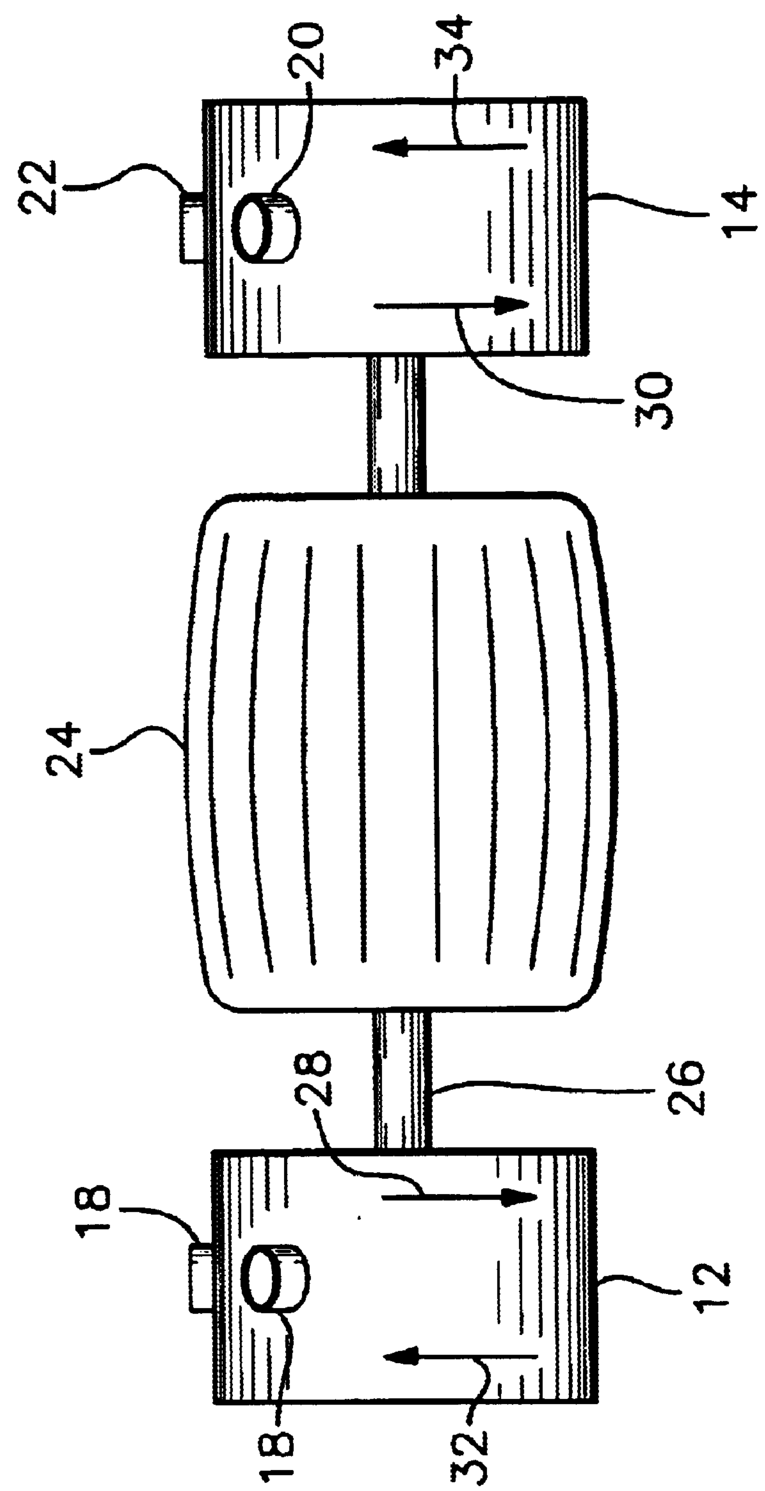
FIG. 2 is an elevational view of the reversible motor and interconnected rotary compressors used in the preferred concentrator of this invention.

Each of the compressors 12 and 14 is operably connected to and driven by a reversible, brushless, DC motor 24. This comprises a standard twin head motor of the type that will be known to persons skilled in the art. As shown in FIG. 2, motor 24 includes an axial drive shaft 26 that is interconnected in a known manner to the axial rotor shafts of compressors 12 and 14, respectively. The motor sequentially reverses, either periodically at predetermined intervals or when predetermined gas pressures are achieved. Specifically, when the motor operates in one direction, shaft 26 drives compressor 12 rotatably in the direction of arrow 28 (hereinafter the forward direction), shown in FIG. 1. Simultaneously, the drive shaft operates compressor 14 in the direction of arrow 30 (hereinafter the reverse direction). When motor 24 reverses, compressor 12 is driven in the reverse direction indicated by arrow 32 in FIG. 1 and compressor 14 is driven in the forward direction indicated by arrow 34.

When the rotor of compressor 12 is turned in the direction of arrow 28, air is drawn into the compressor through line 36

(FIG. 1) and port 16. That air is compressed and pumped out of compressor 12 through port 18 and line 38. Alternatively, when the motor 24 drives the rotor of compressor 12 in the direction of arrow 32, air is drawn into the compressor through line 38 and port 18, and then exhausted from the compressor through port 16 and line 36. Compressor 14 operates in an analogous manner. When motor 24 turns the rotor of compressor 14 in the direction of arrow 30, the compressor draws in air through line 40 and port 20. Such air is discharged through port 22 and line 42. Alternatively, when the motor drives compressor 14 in the opposite direction (arrow 34), air is drawn into the compressor through line 42 and port 22. That air is compressed and pumped out of compressor 14 through port 20 and line 40.

Line 38 comprises a conduit that communicably interconnects port 18 of compressor 12 with an inlet 41 of a first nitrogen filter 42. The nitrogen filter is a standard molecular sieve bed of the type commonly used in oxygen concentrators. Similarly, line 40 comprises a conduit that communicably interconnects port 20 of compressor 14 with an inlet 44 of second nitrogen filter 46. This filter again includes a standard molecular sieve bed.

Conventional means operably interconnect filters 42 and 46 to a patient or other destination requiring concentrated oxygen. In particular, an outlet 48 of filter 42 is connected through a one-way needle valve or check valve 50 to a standard oxygen concentrator mixing tank 52. Likewise, outlet 54 of filter 46 is connected through a one-way needle valve or check valve 56 to mixer 52. The output 58 of mixer 52 is directed through a standard regulator 60 and flow meter 62 to, for example, a patient needing concentrated oxygen.

Figure 3:
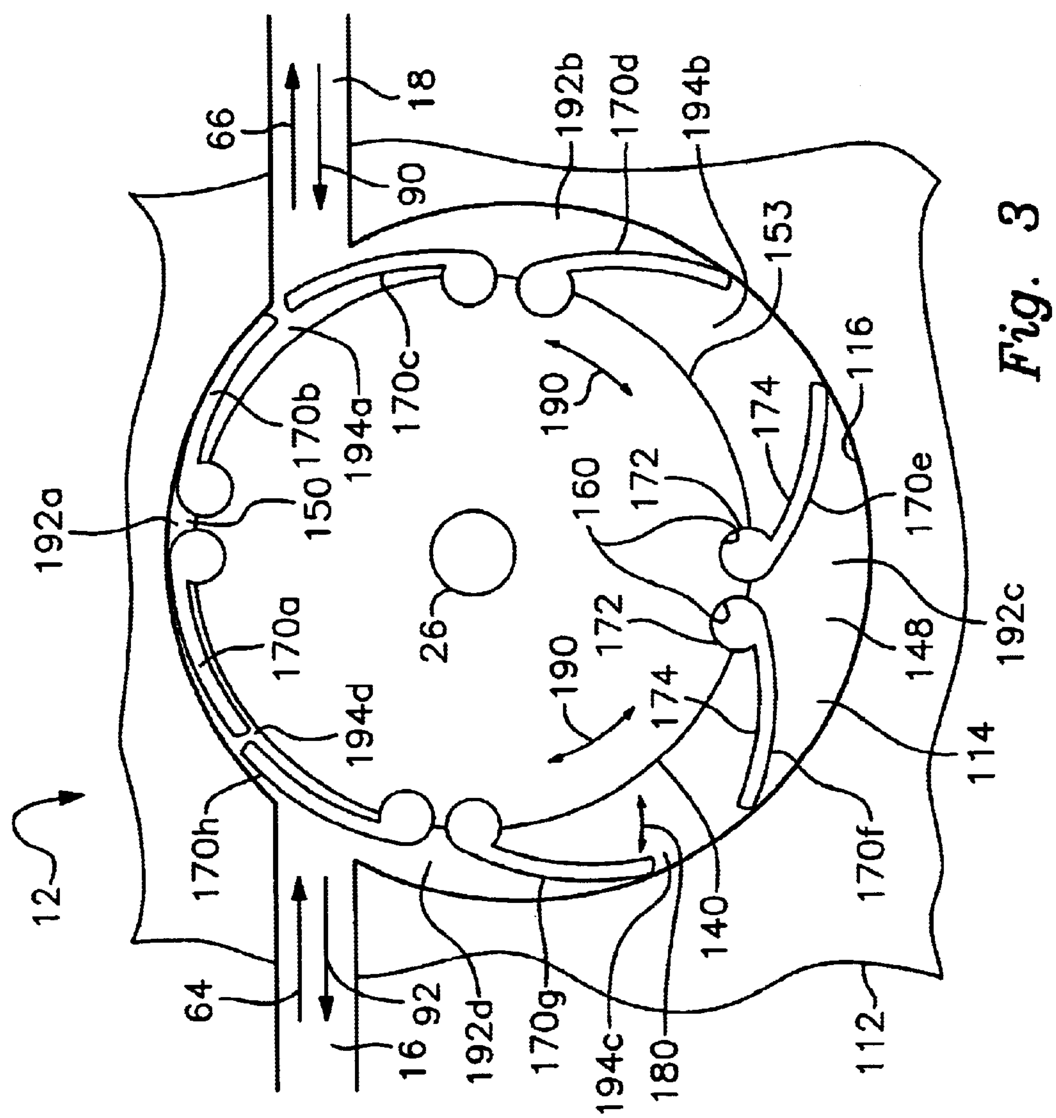
FIG. 3 is an elevational, partly schematic view of a preferred embodiment of the compressor of this invention.
Figure 3A:
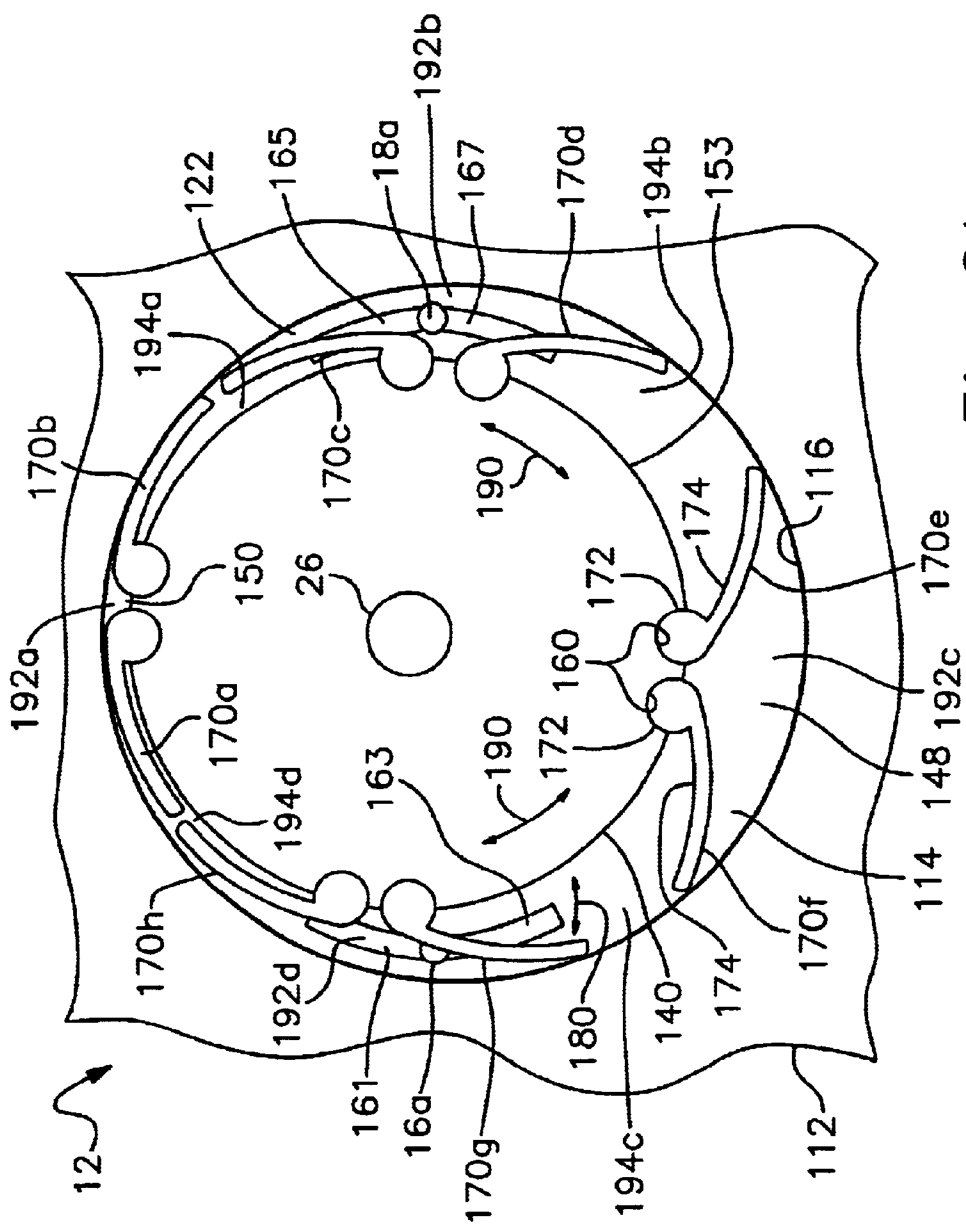
FIG. 3A is a view similar to FIG. 3 of an alternative preferred compressor.

There are shown in FIGS. 3 and 3A, slightly differing versions of a preferred, representative pivoting vane compressor 12, 12*a*, respectively. In each case, the compressor includes a housing 112 that features a generally cylindrical inner chamber 114. The chamber is defined by a cylindrical inner wall 116 composed of Teflon (™) or a similar low-friction material. The other compressor in the concentrator (i.e. compressor 14) is constructed in an analogous manner and operates alternately with compressor 12, 12*a*. The following description should be understood to apply to each compressor in the oxygen concentrator.

In FIG. 3, the intake/exhaust ports 16,18 are shown connected to chamber 114 through the inner circumferential wall 116. In FIG. 3A, the ports 16*a*, 18*a* of compressor 12*a* are connected through a cover plate 122 (see FIG. 4).

Figure 4:
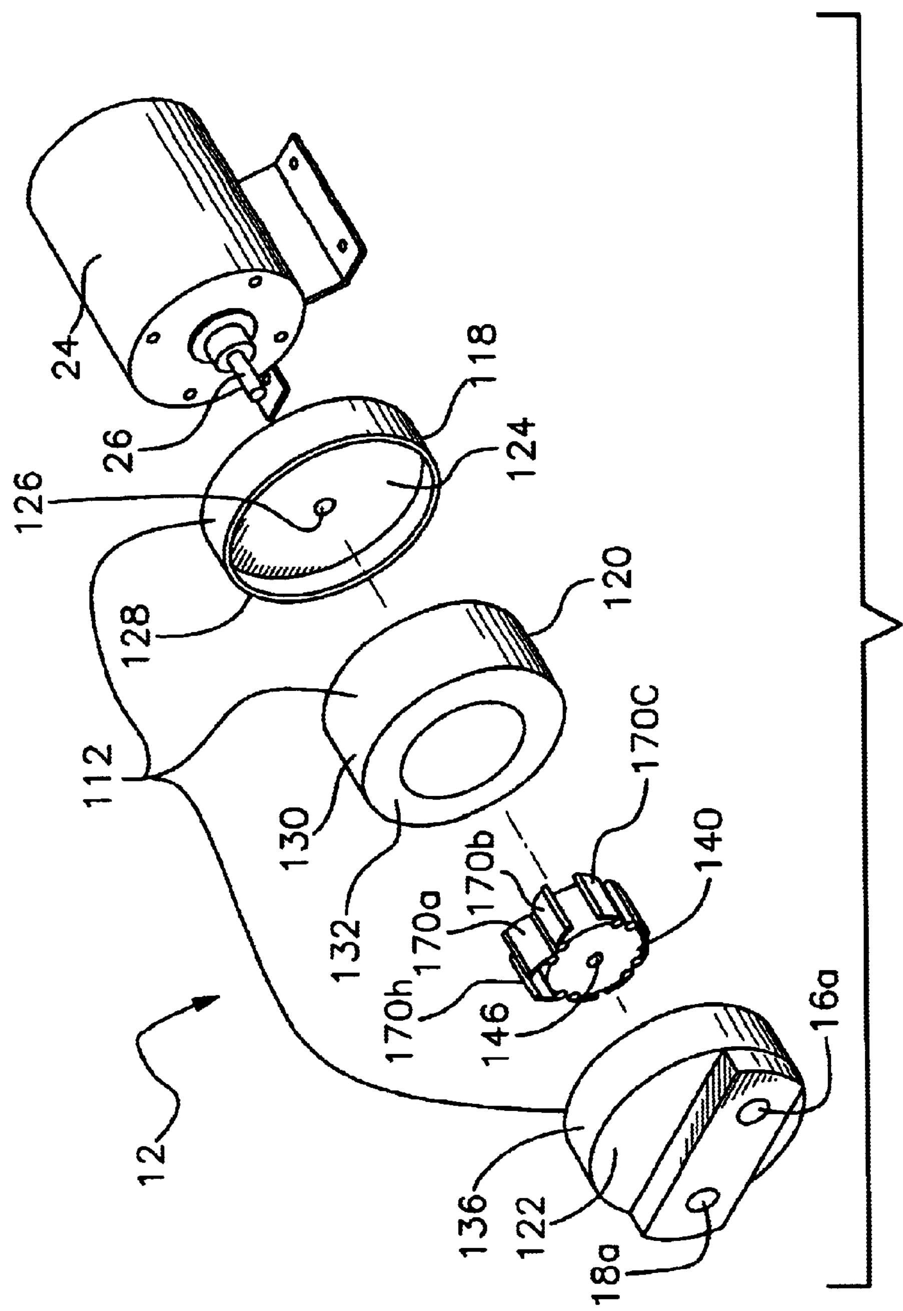
FIG. 4 is an exploded view of the compressor of FIG. 3A.
Figure 5:
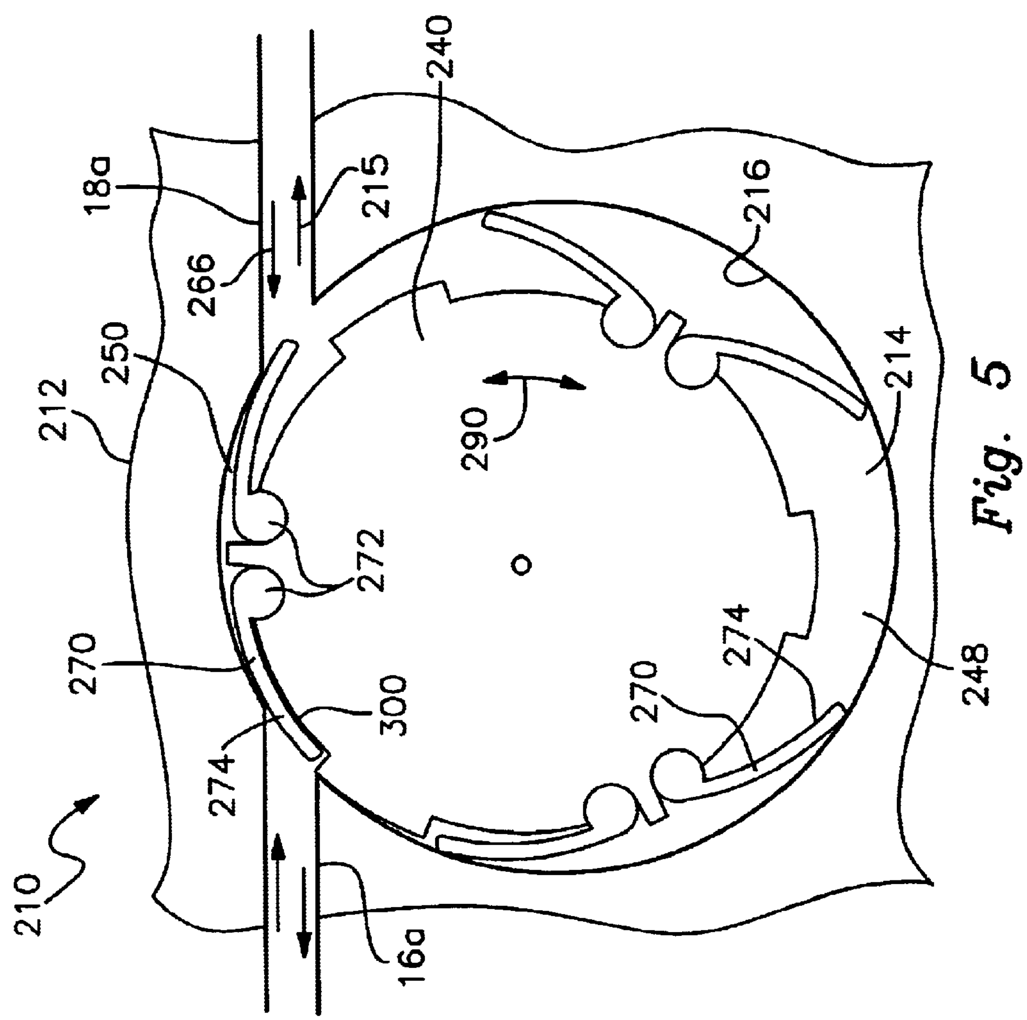
FIG. 5 is an elevational, partly schematic view of an alternative preferred embodiment of the compressor, in which each vane is received in a circumferential recess in the rotor.

The compressor of FIG. 3A is depicted in exploded form in FIG. 4. As shown therein, housing 112 is defined by a casing portion 118, an annular portion 120 and a cover 122. As previously indicated, the cover carries ports 16*a*, 18*a* (see also FIG. 3A). Casing portion 118 features a circular side plate 124 having a central opening 126. A annular wall 128 extends upwardly from plate 124. Annular member 120 fits within wall 128 of casing 118. Annular portion 120 particularly includes a circumferential portion 130 and an annular side wall 132 connected thereto. A central opening 134 is formed in wall 132. Central opening 134 is generally axially aligned with smaller central opening 126 in casing 118. Cover 122 features a circumferential rim 136 that fits over circumferential wall 130 of annular portion 120. The components of housing 112 are interconnected by conventional means that will be known to those persons skilled in the compressor art.

A cooling fan, not shown, may be attached to an extension of shaft 142, which extends outwardly through an opening in cover 122. This fan cools the motor when the compressor turns in one direction. In the opposite direction, the fan clears dust from the concentrator cabinet filter so that air flow into the cabinet is insured. This feature is described more fully below in connection with FIG. 6.

A rotor 140, FIGS. 3, 3A and 4, is mounted eccentrically within chamber 114. More particularly, rotor 140 is mounted fixedly to rotating central shaft 142. As best shown in FIG. 4, central shaft 126 comprises the operational drive shaft of motor 24. Shaft 142 extends through central opening 126 in housing casing 118 and is engaged with rotor 140 through a central opening 146 in the rotor. When the motor 24 is operated, shaft 126 turns rotor 140 within chamber 114 of housing 112. An obscured, opposite end of shaft 126 extends outwardly from the opposite hidden side of motor 24 and is connected in an analogous manner to the rotor of the second compressor (i.e. compressor 14 in FIG. 1). That compressor is omitted for clarity in FIG. 4.

Because rotor 140 is mounted eccentrically within chamber 14, the rotor is surrounded by a main chamber region 148, FIG. 3, that gradually narrows to a constricted chamber region 150. Intake and exhaust ports 16 and 18 operably communicate with the constricted region of the compression chamber. More particularly, ports 16 and 18 are preferably communicably connected to the compression chamber at equal and opposite radial angles relative to the narrowest part of the chamber. The ports are therefore oriented symmetrically about the chamber relative to the constricted chamber region (e.g. at about 9–11 o'clock and 1–3 o'clock positions respectively). The ports are communicably interconnected to the chamber by conventional air lines comprising known types of pipes, hoses or tubing. Alternative port orientations may be employed within the scope of this invention. A third port may be positioned midway between the ports described herein.

Rotor 140 includes eight or some other plurality (e.g. 6, 10 or more) of axially longitudinal channels 160 formed about its circumferential surface 153. Each channel has a generally circular cross-sectional shape and an entrance that is formed in the circumferential surface of the rotor. The interior of each channel includes a diameter that is larger than the entrance to the channel. This permits respective vane elements to be pivotably mounted within the channels as is described more fully below. The channels 160 are typically arranged in adjoining pairs spaced evenly apart about rotor 140, although in alternative embodiments uneven spacing arrangements may be utilized.

As shown in FIGS. 3, 3A and 4, a plurality of vane elements 170*a–h*, which are composed of a wear and heat resistant material such as Teflon (™), are pivotably received respectively in the rotor channels 160. The vanes may comprise Teflon (™) ceramic, a Teflon (™) coated metal or other substance. Each vane element includes a generally cylindrical pin or pivot shaft 172 that is axially aligned with and received by a respective rotor channel 160. Each vane element also includes an elongate curved or arcuate portion 174 that extends integrally from shaft 172.

Each vane element 170*a–h* is mounted to rotor 140 by inserting its shaft 172 into respective one of the longitudinal rotor channels 160. Shaft 172 may be inserted into the channel, for example, by removing cover 122, FIG. 4. The shaft is then slid into its respective channel in the rotor. When inserted in this manner, each vane has a width generally equal to the width or thickness of rotor 140. Typically, shaft 172 has a diameter that is somewhat larger than the entrance of its associated rotor channel 160. As a result, the vane element is secured generally radially to the circumferential surface 153 of the rotor. At the same time, shaft 172 is pivotable within that channel. Each vane is permitted to pivot or rock relative to rotor 140, as indicated by doubled headed arrow 180 in FIG. 3.

Rotor 140 has a substantially smooth circumferential surface 153. Multiple pairs of vanes 172 are pivotably mounted in circumferential surface 153. The proximally adjoining pairs of vanes (170*a* and *b*, 170*c* and *d*, 170*e* and *f*, and 170*g* and *h*) include curved portions that diverge from one another outwardly from the circumferential surface 153. Conversely, each distally adjoining pair of vanes (170*b* and *c*, 170*d* and *e*, 170*f* and *g*, and 170*h* and *a*) converge as the vanes extend outwardly from the rotor. The vanes have a generally uniform thickness, although the outer end or tip of each vane may be somewhat thicker than the inner end or neck proximate the pivoting shaft. A Teflon (™) or Teflon (™) composite material is provided so that the vanes move smoothly with reduced wear.

The vanes are curved so that they substantially flushly conform with the outer circumferential surface 153 of rotor 140 at least as they travel through constricted chamber region 150. This is best illustrated by vane 170*a* traveling through constricted chamber region 150 in FIG. 3.

In operation, the motor 24 drives rotor 140 sequentially in alternating counterclockwise and clockwise directions as indicated by doubleheaded arrows 190. Centrifugal force causes vanes 170*a–h* to pivot outwardly to the greatest extent possible and engage the peripheral wall 116 of chamber 114. Each proximally adjoining, diverging pair of vanes 170*a* and *b*, 170*c* and *d*, 170*e* and *f*, and 170*g* and *h* thereby defines a respective compartment 192*a*, 192*b*, 192*c* and 192*d*. Differently shaped compartments 194*a*, 194*b*, 194*c* and 194*d* are formed between respective pairs of distally adjoining vane elements (70*b, c*; 70*d, e*; 70*f, g* and 70*h,a*) that converge toward one another. More particularly, each compartment is defined by the proximally or distally adjoining pair of vane elements, the circumferential surface 153 of rotor 140 and the inner circumferential chamber wall 116.

As rotor 140 is initially driven in a counterclockwise direction, air is pulled through port 16 and drawn into chamber 114 via compartments 192*a*–192*d* and 194*a*–194*d*, as those compartments successively pass adjacent to port 16. For example, in FIG. 3, compartment 192*d* is shown passing port 16 in a counterclockwise direction. As a result, the air is drawn through port 16 into compartment 192*d* (arrow 64) and this air is transmitted by the rotating vanes through main chamber region 148 and toward second port 18. The air is transmitted within the compartments formed by the pivoting vanes through main chamber region 148 and in a counterclockwise direction back toward constricted chamber region 150. This causes the air, for example in compartment 192*a*, to be compressed by the gradually narrowing crescent shaped chamber. Eventually, the compressed air is discharged through port 18 at a desired pressure. From there, the compressed air is delivered in the direction of arrow 66 through line 38 to nitrogen filter 42. As each of the other compartments successively passes port 16 in a counterclockwise direction, that compartment likewise transmits air from port 16 through main chamber region 148 and back to constricted chamber region 150. As a result, the air is compressed and discharged through port 18 as indicated by arrow 66.

As previously indicated, each arcuate or curved portion 174 has a shape that generally conforms to a corresponding portion of the circumferential surface 153 of rotor 140. As a result, when each vane element is driven through constricted region 150, the arcuate portion of the vane is urged substantially flush against the circumferential surface of the rotor. An extremely compact compartment is formed. Little or no air leakage is exhibited. Improved pressurization and pumping efficiency are thereby accomplished.

At a predetermined time, motor 24 reverses operation and drives rotor 140 in an opposite clockwise direction. As each of the above described compartments passes port 18, air containing residual nitrogen from filter 42 is drawn into the compression chamber as indicated by arrow 90. More particularly, the air is pulled into successive compartments 92*a–d* and 94*a–d* and transmitted by those compartments through main chamber region 148. When each successive compartment reaches port 16, the exhaust air transmitted by the compartment is discharged through that port. Compressor 12 operates alternately in forward and reverse directions (i.e. counterclockwise and clockwise directions) in the foregoing fashion so that air is alternately pumped into and exhausted from the concentrator. At the same time, the other compressor 14 operates analogously in the opposite direction. Accordingly, as compressor 12 pumps air into its nitrogen filter, compressor 14 exhausts air and residual nitrogen from its associated filter, and vice versa. This operation continues as required so that a balanced and consistent air flow is provided. The compressors reverse direction virtually instantaneously so that an uninterrupted and balanced air flow is maintained.

The version shown in FIG. 3A is constructed and operates analogously to that shown in FIG. 3. However, in this version the intake/exhaust ports 16*a*, 18*a* are formed through cover 122 (see also FIG. 4). Also in this embodiment, each port communicates with a pair of grooves or channels formed in the inside surface of cover 122. For example, upper and lower channels 161 and 163 extend upwardly and downwardly respectively in a lobe-like fashion from port 16*a*. Channels 165 and 167 likewise communicably join port 18*a* and respectively extend upwardly and downwardly therefrom. The channels essentially define lobes. These channels serve as air pockets, which enhance the pick-up of air into the compression chamber when the associated port is serving as an intake port. By the same token, when the channels are associated with a port acting as an exhaust port, they enhance the discharge of air from the compression chamber. Air within the contracting compartment is allowed to escape more easily from the compression chamber through the channels. As a result, air resistance and drag within the compression chamber is reduced and compressor operation and efficiency are improved. The rotor is allowed to turn freely while encountering less air resistance within the compression chamber. It should be understood that the depth, number and placement of these channels or pockets may be adjusted within the scope of this invention to achieve selected pumping (e.g. pressurization and evacuation) performance.

It should be noted that the positions of the intake/exhaust ports are depicted schematically in each of the embodiments of this invention. This positioning may be symmetrical about the narrowest part of the compression chamber in both compressors. Nonetheless, alternative positionings and asymmetrical orientations may be employed within the scope of the invention. Placement and arrangement of the pick-up/exhaust channels 161–167 may also be altered to provide various desired levels of pressure and vacuum production. It is also very important that both the closely and the distally adjoining pairs of vanes be curved in opposite directions so that the air transmitting compartments of this invention are properly defined and instantaneous and effective compressor reversibility is exhibited. This provides significantly improved and highly efficient and balanced pumping of air through the concentrator.

Another embodiment of the compressor is depicted in FIG. 4. In this version, compressor 210 again features a housing 212 having an internal chamber 214. A rotor 240 is mounted eccentrically within chamber 214 to define a main chamber region 248 and a constricted chamber region 250. Reversible intake and exhaust ports 252 and 254 are connected with the constricted chamber region.

In this version, rotor 240 includes a plurality of recesses 300 that are spaced about the circumference of the rotor. Each recess 300 receives the entire body 274 of a respective pivoting vane 270. Once again, multiple pairs of pivoting vanes 270 are mounted to the circumferential surface of rotor 240. Each vane includes a pivot shaft 272 that is secured within the rotor in the manner previously described and also shown in U.S. Pat. No. 5,188,524. The vanes 270 feature a composition and construction that is analogous to the vanes previously described and also described in the referenced patent. As rotor 240 is driven back and forth within chamber 214, in the direction of doubleheaded arrow 290, centrifugal force causes the vanes to pivot outwardly such that they engage the circumferential wall 216 of chamber 214.

Each vane 270 is curved such that it conforms to the circumferential curvature within its associated recess 300 of rotor 240. In other words, when vane 272 is pivoted into its respective recess 300, the vane substantially flushly interengages the surface of the recess and therefore the curved surface of the rotor. This is best depicted by the vanes 270 received in recess 300 proximate constricted chamber region 250 (i.e. at the 12 o'clock position). In operation, as the rotor is turned by the motor alternately in the directions of doubleheaded arrow 290, the adjoining pairs of vanes 270 pivot outwardly and interengage the outer wall of chamber 214. Air is first drawn into the compression chamber through port 16*a*. Each adjoining pair of vanes 270 defines a compartment that transmits the introduced air counterclockwise through the gradually expanding and then contracting crescent shaped chamber 214. Eventually, each adjoining pair of vanes transmits the air within its associated compartment to constricted chamber region 250. At this point, the vanes are forced into their respective recesses 300 and the compartment space is extremely constricted. Improved and highly efficient compression of the transmitted air is thereby achieved. This compressed air is then exhausted through port 18*a* in the direction of arrow 215 and pumped to the associated nitrogen filter. When the compressor reverses direction, the pivoting vanes are rotated clockwise, as in the prior embodiment. Air from the filter is pulled into the compressor as indicated by arrow 266. The pivoting vanes and their associated compartments move the air clockwise from port 78*a* through main chamber region 248 and back to port 16*a*, through which the air is exhausted.

In each version of this invention improved compression and pumping are obtained. The vane design disclosed in each of the embodiments may be interchanged in any of the other versions in accordance with this invention. Likewise, the specific rotor designs may be substituted for one another. In certain versions, the rotor may include recesses for receiving enlarged tip portions of the vanes. See U.S. Pat. No. 6,371,745.

It should also be noted that a variety of reversible motors can be used to operate the compressor. Because the compressor vanes efficiently collect and move a greater volume of air with little leakage, a relatively low speed motor can be used. This significantly reduces the noise generated by the compressor and also reduces vane breakage and maintenance costs.

The overall operation of the oxygen concentrator utilizing compressors constructed in the foregoing manner is depicted in FIG. 1. In operation, motor 24 is started and driven in a reversible manner. For example, initially shaft 26 is rotated to drive the rotor of compressor 12 in forward direction 28. Simultaneously, the motor drives the rotor of compressor 14 in the reverse direction 30. (See also FIG. 2.) Air is drawn into compressor 12 through line 36 and port 16 in the manner indicated by arrow 64, FIG. 1. This air is compressed and pumped out of compressor 12 through port 18 and line 38, as indicated by arrows 66. The compressed air is directed by line 38 into and through filter 42, wherein the air is filtered. Nitrogen is removed by filter 42 and concentrated oxygen is discharged from filter outlet 48 and transmitted through valve 50 and into mixer 52, in the manner indicated by arrow 68.

While the above described process is occurring in compressor 12 and filter 42, compressor 14 simultaneously evacuates the air contained in second filter 46. As the rotor of compressor 14 is driven in the reverse direction of arrow 30, at least a partial vacuum is created in filter 46. Air and any previously extracted nitrogen that are contained in filter 46 are pulled out of that filter through inlet 44 and line 40, as indicated by arrow 70, and are drawn into compressor 14 through port 20. This exhausted gas is then discharged from the compressor through port 22 and line 40, as indicated by arrow 72. Valve 56 prevents concentrated oxygen contained in mixer 52 from being drawn back into filter 46. At this point in the operation of concentrator 10, filter 42 is pressurized to produce concentrated oxygen, whereas filter 46 includes at least a partial vacuum.

As previously indicated, motor 24 periodically and sequentially reverses direction. Such reversal may be initiated by various means. For example, a timer 72, shown in phantom in FIG. 1, may cause motor 24 to reverse direction at predetermined time intervals (e.g. every 8–10 seconds). Alternatively, filters 42 and 46 may be equipped with respective pressure sensing switches 74 and 76 that are designed to detect predetermined pressure or vacuum levels. For example, switch 74 may comprise a pressure sensitive switch. When a predetermined pressure level is sensed in filter 42 (due to compressed air being introduced through that filter), a signal may be sent over lines 78 and 80 to motor 24, which signal causes the motor to reverse direction. In an analogous manner, switch 76 may comprise a vacuum sensitive switch that sends a signal over lines 82 and 80 to motor 24, causing the motor to reverse direction when a predetermined vacuum level is sensed in filter 46. In alternative embodiments, other pressure and/or vacuum sensing switches may be provided in one or both of the filters. In still other versions, a pressure sensitive switch 86 may be contained within mixer 52. When a predetermined pressure level is measured in the mixer, a signal is sent over lines 88 and 80 to motor 24, which causes the motor to reverse direction. Accordingly, the motor may be reversed either at predetermined time intervals or when predetermined pressure and/or vacuum levels are sensed within the respective filters and/or the mixer.

In any event, when motor 24 reverses direction, the compressor rotors are driven by shaft 26 in respective directions that are opposite to those previously described. In the example disclosed herein, the compressor of rotor 12 is driven in the reverse direction of arrow 32 and the rotor of compressor 14 is driven in the forward direction of arrow 34. This causes compressor 12 to draw a vacuum in filter 42. Air and previously extracted nitrogen remaining in filter 42 are evacuated from the filter through line 38, as indicated by arrow 90. This gas is drawn into the compressor through port 18 and is exhausted through port 16 and line 36 in the direction of arrow 92. As during the previously described sequence, valve 50 prevents previously concentrated oxygen from being drawn out of mixer 52 and back into filter 42.

Simultaneously, compressor 14 is driven in the forward direction of arrow 34. Fresh air is drawn into that compressor through line 42 and port 22, as indicated by arrow 94. This air is compressed and pumped out of compressor 14 through port 20 and line 40, as indicated by arrow 96. The compressed air is introduced into previously evacuated filter 46 through inlet 44. Filter 46 is pressurized and the compressed air is filtered. Nitrogen is extracted and concentrated oxygen is discharged through outlet 54. This oxygen is delivered through one-way valve 56 to mixer 52. Accordingly, the mixing tank receives concentrated oxygen alternately from filters 42 and 46.

Motor 24 continues operating in the second direction for either the previously described predetermined time period or until a predetermined pressure and/or vacuum has been sensed in the filters and/or mixer. At such a point, an appropriate signal is sent to motor 24, which again causes the motor to reverse direction. The motor again operates in the first direction, as previously described, and the entire sequence is repeated continuously to provide a steady supply of concentrated oxygen to mixer 24. During the first half of the cycle (while motor 24 is operated in the first direction) filter 42 removes nitrogen from the air pumped into that filter by compressor 12 to produce concentrated oxygen, while a vacuum is simultaneously drawn in filter 46. During the second half of the motor's cycle, the reverse occurs. Air is pumped by compressor 14 through filter 46 to produce concentrated oxygen and filter 42 is evacuated by compressor 12.

Concentrated oxygen is directed from mixer 52 to the patient or other destination requiring such oxygen in a conventional manner. Specifically, the oxygen is conducted from mixer outlet 58 through regulator 60 and flow meter 62, as required.

Concentrator 10 eliminates the standard 3-way and 4-way valves and associated timers that are conventionally required for directing compressed air to and between a plurality of molecular sieve bed filters. As a result, the complexity, weight and expense of concentrator 10 are significantly less than most standard devices. The two stage pressurization/evacuation process utilized by concentrator 10 also significantly improves the efficiency of the apparatus. Each filter is evacuated before compressed air is pumped through that filter. As a result, the incoming compressed air encounters little if any resistance. Energy efficiency is improved considerably and a smaller horsepower motor may be employed. Each time the motor reverses, the compressor utilizes the pressure or vacuum that is has created during the prior half-cycle to initiate turning of its rotor in the reverse direction. The power consumption normally required during start-up of the rotor is reduced considerably. As a result, the motor may be powered by either a standard stationary DC power source or a portable source, such as a batter or the 12 volt system of an automobile.

It should be noted that, in alternative embodiments, the compressors described above may be used in an oxygen concentrator that employs only a single compressor and associated nitrogen filter. An operation and beneficial results analogous to those described above are similarly achieved in this version. In multiple compressor versions each compressor may be driven by its own associated motor. In other words, multiple reversible motors may be employed, each for driving a respective compressor.

It is important that the compressors in the dual compressor embodiment be constructed identically and operate in a complementary alternating fashion. Specifically, the ports should be located at like orientations in both compressors. In this way, a balanced, continuous air flow is achieved. An even level of air flow passes through each nitrogen filter and as a result, a consistent level of concentrated oxygen is provided to the patient. The construction of the pivoting vane compressors permits the compressors to reverse direction instantaneously and effectively. As a result, air flow is not interrupted. Preferably, the ports are oriented at equal and opposite radial angles to the narrowest portion of the compression chamber. This again improves balance and efficiency and contributes to a very smooth uninterrupted operation. In still other versions, alternative port orientations may be employed. Alternative number of intake and exhaust ports may also be utilized.

Figure 6:
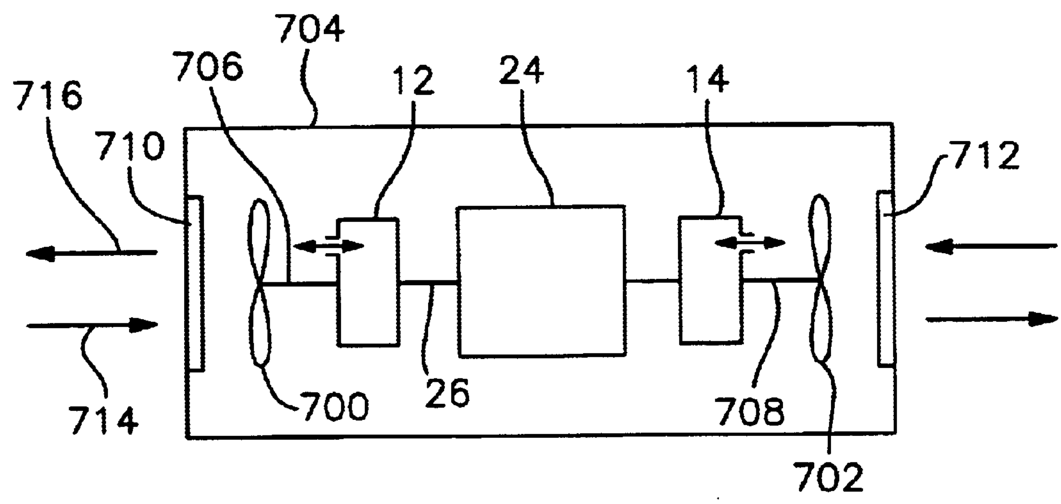
FIG. 6 is a schematic view of the reversible dual compressor assembly with reversible fans mounted within the cabinet.

An embodiment utilizing fans 700 and 702 is shown in FIG. 6. Therein, compressors 12 and 14, as well as reversible motor 24 are enclosed within a cabinet 704. The shaft 26 that drives rotors 12 and 14 carries axially driven extensions 706 and 708, which operate fans 700 and 702 respectively. Cabinet 704 includes openings at the respective ends. Each opening is covered by a respective filter 710, 712.

During operation, the reversible motor sequentially drives compressors 12 and 14 in alternating directions, as previously described. When compressor 12 is driven in a forward direction to pump air into its respective concentrator, fan 700 operates to cool motor 24 and also pulls air into the cabinet 704 through filter 710, as illustrated by arrow 714.

When motor 24 reverses, fan 700 is driven in a reverse direction so that previously collected dirt and dust is blown off of filter 710, as indicated by arrow 716. Fan 702 operates in an analogous alternating sequence. While fan 700 is cooling the motor and pulling into compressor 12, fan 702 is blowing dirt and dust from filter 712. When fan 700 is cleaning filter 710, fan 702 is pulling air into compressor 14 and cooling motor 24. Various fans may be used within the scope of this invention. Moreover, the cabinet may be modified from the version shown in FIG. 6.

Figure 7:
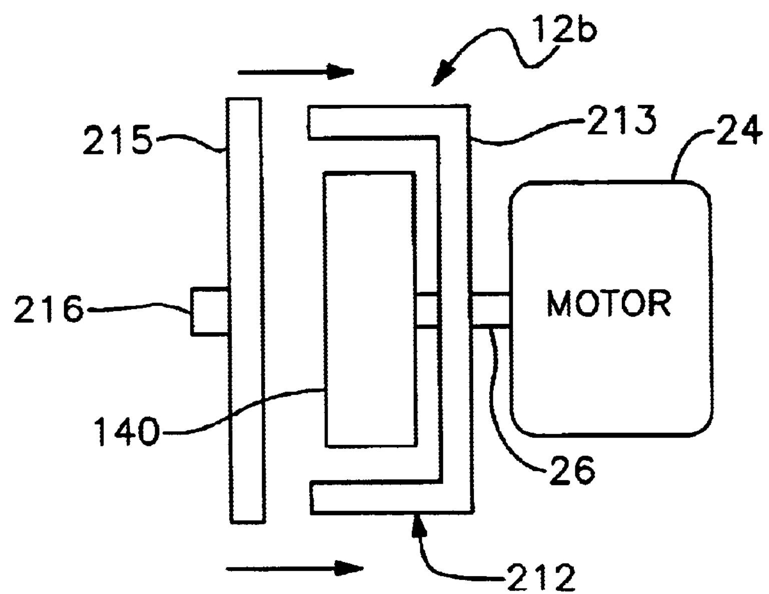
FIG. 7 is a schematic view of an alternative compressor housing.

FIG. 7 depicts a compressor **12*b* that is modified slightly from the compressor shown in FIG. 4. In this version, a two-part housing is employed. More particularly, motor 24 is attached to compressor rotor 140 through a drive shaft 26. The rotor is accommodated within a housing 212 that includes a base 213 and a cover 215. The rotor is disposed within the base and the cover is attached directly to an upper rim or edge of the base by bolts or other known means so that the rotor is enclosed within the housing. Once again, appropriate ports, e.g. port 216**, are formed through the cover into the compression chamber. These ports and the remainder of the compressor are constructed and operate in a manner identical or at least analogously to the versions previously described.

From the foregoing it may be seen that the apparatus of this invention provides for a reversible pivoting vane rotary compressor and in particular to a compressor used in a valve-free oxygen concentrator and analogous applications. While this detailed description has set forth particularly preferred embodiments of the apparatus of this invention, numerous modifications and variations of the structure of this invention, all within the scope of the invention, will readily occur to those skilled in the art. Accordingly, it is understood that this description is illustrative only of the principles of the invention and is not limitative thereof.

Although specific features of the invention are shown in some of the drawings and not others, this is for convenience only, as each feature may be combined with any and all of the other features in accordance with this invention.

Other embodiments will occur to those skilled in the art and are within the following claims:

What is claimed is:

1. A reversible pivoting vane rotary compressor comprising:

a housing having a generally cylindrical chamber defined by an inner wall;

a rotor mounted eccentrically within said chamber to define about said rotor a generally crescent shaped compression chamber, which narrows from a main chamber region to a constricted chamber region, said rotor having a circumferential surface;

a pair of reversible intake and exhaust ports connected communicably with said constricted chamber region, each port for selectively and alternately introducing air into said constricted chamber region while the other port exhausts air from said constricted region;

at least one adjoining pair of curved vanes pivotably attached to said rotor and extending in generally opposite arcuate directions from said rotor into said chamber; and means for rotatably driving said rotor alternately in opposing first and second directions such that both of said adjoining vanes are urged simultaneously against the inner wall of the chamber to define at least one compartment that transmits the air through said chamber between said pair of intake and exhaust ports and through said main chamber region, whereby air introduced through a selected one of said ports is compressed and discharged through the other port, said circumferential surface of said rotor and each said vane having conforming curvatures and said rotor positioned within said chamber such that each said vane is driven into flush interengagement with said circumferential surface when said vane is driven by said rotor into said constricted chamber region.

2. The compressor of claim 1 in which at least one said pair of vanes extend outwardly from said rotor in a convergent manner.

3. The device of claim 1 in which at least one said pair of vanes extends outwardly from said rotor in a divergent manner.

4. The device of claim 1 in which said pair of ports are oriented about said chamber at equal and opposite radial angles relative to a narrowest portion of said constricted chamber region.

5. The device of claim 1 in which at least one air pocket is formed in said inner wall within said compression chamber, which channel is communicably connected to an associated said port for facilitating transmission of air into and out of said chamber.

6. An oxygen concentrator employing a reversible pivoting vane rotary compressor, said concentrator comprising:

a nitrogen filter;

a reversible pivoting vane rotary compressor that includes a housing having a generally cylindrical chamber defined by an inner wall, a rotor mounted eccentrically within said chamber to define about said rotor a generally crescent shaped compressor chamber, which narrows from a main chamber region to a constricted chamber region, said rotor having a circumferential surface, a pair of reversible intake and exhaust ports connected communicably with said constricted chamber region, each port for selectively and alternately introducing air into said constricted region while the other port exhausts air from said constricted region, and at least one adjoining pair of curved vanes pivotably attached to said rotor and extending in generally opposite arcuate directions from said circumferential surface of said rotor into said chamber;

a reversible motor, for rotatably driving said rotor alternately in opposing first and second directions such that both of said adjoining pair of vanes are urged simultaneously against said inner walls of the chamber to define at least one compartment that transmits the air through said chamber between said pair of intake and exhaust ports and through said main chamber region, such that when said rotor is driven in a first forward direction, air is pumped into and through said nitrogen filter to extract nitrogen from the air pump therethrough and produce concentrated oxygen, and when said rotor is driven in the opposite direction, said extracted oxygen is exhausted from said filter by said compressor;

a cabinet for enclosing said compressor and said motor, said cabinet having an opening for introducing air into and removing air from said cabinet, and further comprising a filter engaged with said opening; and a fan operably connected to said motor for cooling said motor and pulling air into said cabinet through said filter when said motor operates in a first direction, and for blowing exhaust air from said compressor through said filter to dislodge dirt and dust therefrom when said motor operates in the reverse direction.

7. The device of claim 6 in which said circumferential surface of said rotor and each said vane have substantially conforming curvatures and said rotor is positioned within said chamber such that each said vane is driven into substantially flush interengagement with said circumferential surface when said vane is driven by said rotor into said constricted chamber region.

8. The compressor of claim 6 in which at least one said pair of vanes extend outwardly from said rotor in a convergent manner.

9. The device of claim 6 in which at least one said pair of vanes extends outwardly from said rotor in a divergent manner.

10. The device of claim 6 in which said pair of ports are oriented about said chamber at equal and opposite radial angles relative to a narrowest portion of said constricted chamber region.

11. An oxygen concentrator comprising:

first and second nitrogen filters;

a first reversible pivoting vane rotary compressor that is communicably connected to said first filter and a second reversible pivoting vane rotary compressor that is communicably connected to said second filter, each compressor including a housing having a generally cylindrical chamber defined by an inner wall, a rotor mounted eccentrically within said chamber to define about said rotor generally crescent shaped compression chamber, which narrows from a main chamber region to a constricted chamber region, said rotor having a circumferential surface, a pair of reversible intake and exhaust ports connected communicably with said constricted chamber region, each port for selectively and alternately introducing air into said constricted chamber region while the other port exhausts air from said constricted region, and at least one adjoining pair of curved vanes pivotably attached to said rotor and extending in generally opposite arcuate directions from said rotor into said chamber; and at least one motor for rotatably driving said rotors of said first and second compressors alternately in opposing first and second directions such that in each said compressor, both of said adjoining vanes are urged simultaneously against the inner wall of the chamber to define at least one compartment that transmits the air through said chamber between said pair of intake and exhaust ports and through said main chamber region such that air introduced through one of said ports is compressed and discharged through the other port; whereby said motor means drives said first compressor in a forward direction to pump air into and through said first filter while simultaneously driving said second compressor in a reverse direction to evacuate said second filter, and alternately drives said first compressor in a reverse direction to evacuate said first filter while simultaneously driving said second compressor in a forward direction to pump air into and through said second filter, said circumferential surface of said rotor and each said vane having conforming curvatures and said rotor positioned within said chamber such that each said vane is driven into flush interengagement with said circumferential surface when said vane is driven by said rotor into said constricted chamber region.

12. The compressor of claim 11 in which at least one said pair of vanes extend outwardly from said rotor in a convergent manner.

13. The device of claim 11 in which at least one said pair of vanes extends outwardly from said rotor in a divergent manner.

14. The device of claim 11 in which said pair of ports are oriented about said chamber at equal and opposite radial angles relative to a narrowest portion of said constricted chamber region.

* * * * *